Patented May 16, 1950

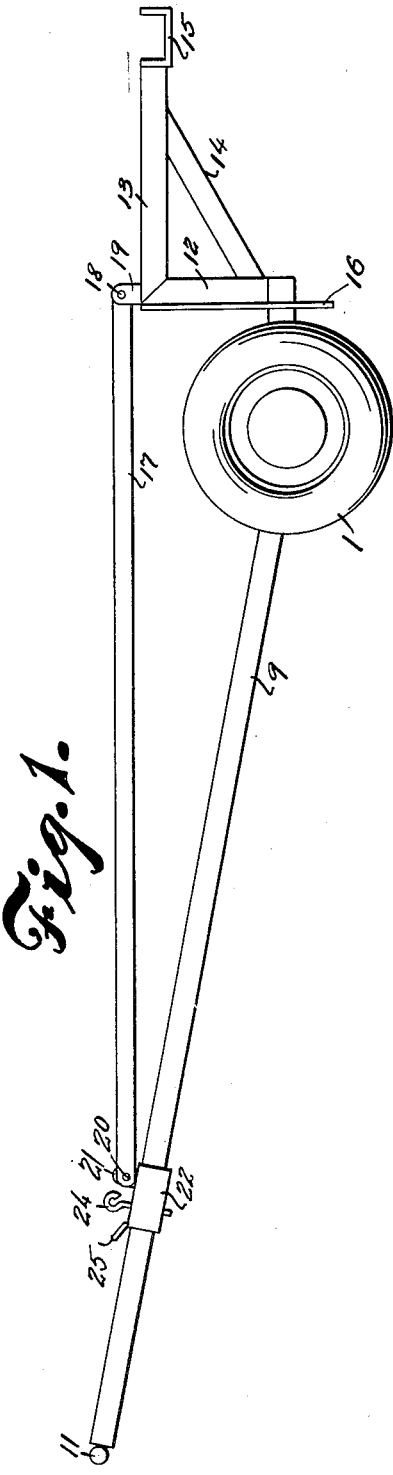

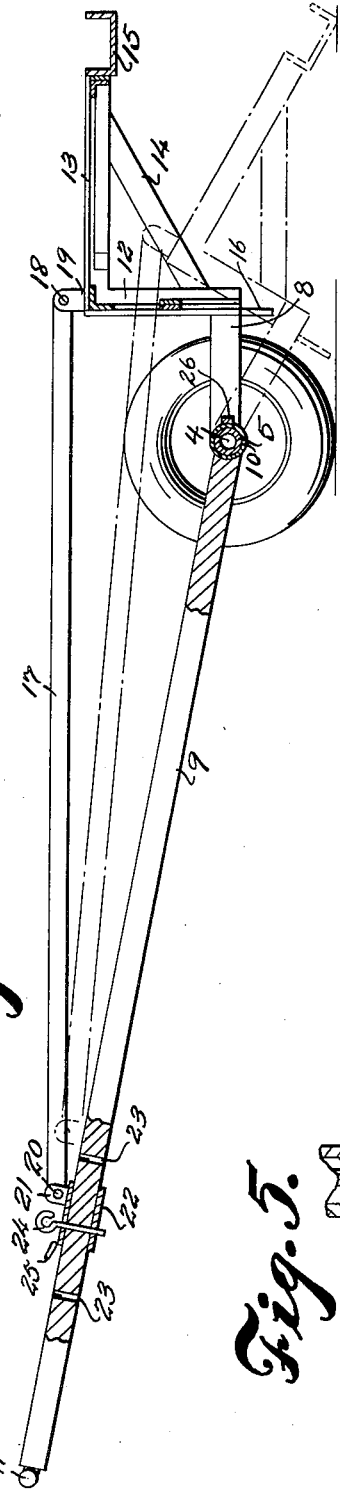

2,507,612

UNITED STATES PATENT OFFICE 2,507,612

IMPLEMENT PICKUP

George A. Rankin, Jr., Sturgeon Bay, Wis.

Application May 20, 1947, Serial No. 749,329

1 Claim. (Cl. 214—77)

The present invention relates to the general class of two-wheel manually controlled implements for material and article handling, and more specifically to an improved pick up implement or two-wheeled hand-steered truck, which while adapted for warehouse and other purposes, is especially designed for use in shops and other industrial places for moving or transporting and storing non-wheeled appliances, as for instance agricultural implements about a farm or barn.

The primary object of the invention is the provision of a hand truck of this type that is comparatively light in weight but strong and durable, which is composed of a minimum number of parts that may with facility be manufactured at low cost of production and assembled with convenience to insure a manually operated two-wheel implement that may be manipulated with ease for picking up devices or implements, and with equal facility which may be handled for unloading and storing the article or implement constituting the load.

The invention consists essentially in certain novel features of construction and combinations and arrangements of parts involving the use of the wheels as a fulcrum for leverage in picking up, or loading and unloading the truck, and in other combinations and arrangements of parts as will hereinafter be described, and more specifically pointed out in the appended claim.

In the accompanying drawings I have illustrated a complete example of a physical embodiment of my invention in which the parts are combined and arranged according to one mode I have devised for the practical application of the principles of my invention. It will however be understood that changes and alterations are contemplated and may be made in these exemplifying drawings and mechanical structures, within the scope of my claim, without departing from the principles of the invention.

Figure 1 is a view in side elevation of a two wheeled implement or hand truck in which my invention is physically embodied; and Figure 2 is a top plan view of the structure in Fig. 1.

Figure 3 is a vertical sectional view, taken longitudinally of the implement, as at line 3—3 of Fig. 2, and showing the pick-up elements in the lower position in broken lines.

Figure 4 is an end elevational view of the implement looking toward the pick-up end.

Figure 5 is a horizontal detail sectional view showing the means for laterally adjusting the two wheels of the truck.

As shown in the drawings the truck is supported on two preferably pneumatic wheels 1 and 2 that are laterally adjustable as indicated by dotted lines in Fig. 4, and as best seen in Fig. 5 each wheel is provided with an axle as 3 and 4 on which the wheels are journaled, in order that the wheels may be employed as fulcrums for leverage in loading and unloading the truck.

The axles 3 and 4 are alined and mounted for transverse adjustment in widening or contracting the treads of the wheels, and these axles are rigidly mounted in adjusted position in sleeve or housing 5, and fixed in adjusted position by means of set bolts or screws 6, 6, which bolts also pass through holes in the tubular housing 5 and through registering holes in sleeves 7, 7, of two laterally spaced horizontal frame arms 8, 8.

The frame arms 8, 8, are thus pivotally mounted with the tubular housing of the two axles, and a central longitudinally extending tongue 9 has a tubular head or hub pivotally mounted on the housing in order that the tongue, by use of its cross handle 11 may be employed as a lever in raising or lowering the frame arms 8, 8, as indicated by dotted lines in Fig. 3 through radius rods 17, where the wheels are utilized as a fulcrum in loading or unloading the truck.

The tubular head or hub 10 and the hubs of the arms 8 are positioned on the sleeve or housing 5 by spacer bars 26 and 27, as shown in Figure 5.

The two laterally spaced lever arms 8, 8, support an angular frame or carrier that includes a pair of upright posts 12, 12 of angle irons, and a somewhat U-shaped frame 13 that is normally disposed in horizontal position, and braced by diagonal bars 14, 14, to project forwardly of the wheels 1 and 2. At the front end of the carrier a centrally located loading or attaching hook 15 is mounted for use in engaging the load to be carried, and at the front of the wheels are provided two wheel guards 16, 16, rigidly mounted on the carrier. The wheel guards may or may not be used, as desired, and are only usable with the wheels in the retracted position.

The carrier or platform frame is adjustable with relation to the axles and to the lever-tongue so that it may be lowered for a low lifting operation, or raised for a higher lifting operation.

For this purpose the adjusted carrier is retained in fixed position by means of a pair of radius bars 17, 17, that are pivoted at 18, 18, in upstanding ears 19 rigidly mounted on the top rear portion of the carrier frame. These converging rods, at their rear ends are pivoted at 20 on an upstanding ear 21 rigid with a tubular slide 22 that is mounted on the lever or tongue 9, and the tongue, as best seen in Fig. 2 is provided with a series of spaced holes 23 for selective use in receiving a locking pin 24 that passes through alined holes in the tubular slide which register with the selected hole 23 of the tongue, and the slide may be provided with a loop or handle 25 to facilitate its movement on the tongue or lever.

By shifting the slide toward the wheels the carrier may be lowered with a pivotal action through the axes of the wheels; when the slide is shifted toward the handle 11 the carrier may be raised; and in either adjusted position the locking bolt retains the tongue and the carrier in rigid relation.

As thus described and illustrated it will be apparent that the hand truck may be employed on a farm for instance, in picking up a gang plow or harrow, by first setting the carrier for insertion under the implement, as indicated by dotted lines in Fig. 3 and then drawing the carrier upward by bringing the tongue downward; and then the loaded truck may be leveled for transportation, pushed or pulled to its destination, and finally deposited with convenience at a desired place.

Having thus fully described my invention, what I claim as new and desire to secure by Letters Patent is:

In a two-wheel hand truck, the combination which comprises a tongue having a hub at the end and provided with spaced pin-receiving openings intermediate of the ends, a slider slidably mounted on said tongue and having openings therethrough positioned to register with the pin-receiving openings of the tongue, a transversely disposed tubular axle housing carried by the hub at the end of the tongue, a pair of stub axles with wheels on the outer ends adjustably mounted in said housing, means securing said stub shafts in adjusted positions in the housing, a plurality of forwardly extending arms carried by the housing, vertically disposed posts carried by the outer ends of the arms, radius rods connecting the upper ends of the posts to the slider on the tongue, and a horizontally disposed frame having an attaching hook on the outer edge mounted on the posts.

GEORGE A. RANKIN, Jr.

REFERENCES CITED

The following references are of record in the file of this patent:

UNITED STATES PATENTS

| Number | Name | Date |
| --- | --- | --- |
| 411,353 | Riddell | Sept. 17, 1889 |
| 897,853 | Vom Scheidt | Sept. 1, 1908 |
| 1,125,227 | Weaver | Jan. 19, 1915 |
| 1,143,475 | Wise | June 15, 1915 |
| 1,241,418 | Mosher | Sept. 25, 1917 |
| 1,350,527 | Staley | Aug. 24, 1920 |
| 2,150,503 | Hawkins | Mar. 14, 1939 |

FOREIGN PATENTS

| Number | Country | Date |
| --- | --- | --- |
| 9,754 of 1900 | Great Britain | Dec. 15, 1900 |
| 491,558 | Great Britain | Sept. 2, 1938 |